(12) United States Patent
Lim et al.

(10) Patent No.: US 10,785,432 B2
(45) Date of Patent: Sep. 22, 2020

(54) IMAGE SENSOR

(71) Applicant: Samsung Electronics Co., Ltd., Suwon-si, Gyeonggi-do (KR)

(72) Inventors: Jung wook Lim, Hwaseong-si (KR); Sung Soo Choi, Hwaseong-si (KR); Eun Sub Shim, Hwaseong-si (KR); Jung Bin Yun, Hwaseong-si (KR); Sung-Ho Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/122,215

(22) Filed: Sep. 5, 2018

(65) Prior Publication Data
US 2019/0230302 A1 Jul. 25, 2019

(30) Foreign Application Priority Data
Jan. 23, 2018 (KR) .......................... 10-2018-0008220

(51) Int. Cl.
*H04N 5/359* (2011.01)
*H04N 5/357* (2011.01)
*H04N 5/374* (2011.01)
*H04N 5/378* (2011.01)

(52) U.S. Cl.
CPC ......... *H04N 5/3597* (2013.01); *H04N 5/3575* (2013.01); *H04N 5/3577* (2013.01); *H04N 5/3594* (2013.01); *H04N 5/374* (2013.01); *H04N 5/378* (2013.01)

(58) Field of Classification Search
CPC .. H04N 5/3575; H04N 5/3594; H04N 5/3597; H04N 5/378
See application file for complete search history.

(56) References Cited

U.S. PATENT DOCUMENTS

| | | | |
|---|---|---|---|
| 7,323,671 B1 | 1/2008 | Toros et al. | |
| 7,839,441 B2 | 11/2010 | Wantanabe | |
| 8,068,158 B2 | 11/2011 | Ohtsuki | |
| 8,792,037 B2 | 7/2014 | Hasegawa et al. | |
| 9,780,138 B2 | 10/2017 | Dupont | |
| 2006/0180741 A1* | 8/2006 | Agranov | H01L 27/14609 250/208.1 |

(Continued)

FOREIGN PATENT DOCUMENTS

| | | |
|---|---|---|
| JP | 2006-042120 A | 2/2006 |
| JP | 2006-345483 A | 12/2006 |

(Continued)

*Primary Examiner* — Daniel M Pasiewicz
(74) *Attorney, Agent, or Firm* — Lee IP Law, PC

(57) ABSTRACT

An image sensor includes a photoelectric converter to generate charges in response to incident light and to provide the generated charges to a first node, a transfer transistor to provide a voltage of the first node to a floating diffusion node based on a first control signal, a source follower transistor to provide a voltage of the floating diffusion node as a unit pixel output, a correlated double sampler (CDS) to receive the unit pixel output and to convert the unit pixel output into a digital code. The first control signal having first, second, and third voltages is maintained at the second voltage in a period between when the voltage of the first node is provided to the floating diffusion node and when the CDS is provided with the voltage of the first node as the unit pixel output.

12 Claims, 12 Drawing Sheets

(56) References Cited

U.S. PATENT DOCUMENTS

| | | | |
|---|---|---|---|
| 2006/0275940 A1 | 12/2006 | Su et al. | |
| 2009/0174799 A1* | 7/2009 | Lee .................. | H04N 5/35554 |
| | | | 348/294 |
| 2012/0305751 A1* | 12/2012 | Kusuda .............. | H04N 5/35509 |
| | | | 250/208.1 |
| 2012/0320245 A1* | 12/2012 | Hasegawa ............ | H04N 5/357 |
| | | | 348/300 |
| 2015/0200229 A1* | 7/2015 | Rotte ................ | H01L 27/14812 |
| | | | 250/208.1 |
| 2017/0251189 A1 | 8/2017 | Tsukagoshi | |

FOREIGN PATENT DOCUMENTS

| | | |
|---|---|---|
| JP | 2009-283599 A | 12/2009 |
| JP | 2017-505051 A | 2/2017 |
| WO | WO 2015/107177 A1 | 7/2015 |

\* cited by examiner

IMAGE SENSOR

CROSS-REFERENCE TO RELATED APPLICATION

Korean Patent Application No. 10-2018-0008220, filed on Jan. 23, 2018, in the Korean Intellectual Property Office, and entitled: "Image Sensor," is incorporated by reference herein in its entirety.

BACKGROUND

1. Field

Embodiments relate to an image sensor, and more particularly, to an image sensor with low noise.

2. Description of the Related Art

An image sensor converts an optical image into an electrical signal (e.g., a digital image). As the computer and communication industries continue to develop, image sensors with high performance are demanded in various fields including, e.g., digital cameras, camcorders, personal communication systems, game devices, security cameras, medical micro-cameras, and robotics.

When a bright light is received or transmitted in a particular area of an image sensor capturing an image, noise may be included in the captured image in a row or horizontal direction. This type of noise is referred to as smear like horizontal band noise (SHBN).

The SI-MN is caused by various reasons. The SHBN should be reduced or eliminated to improve image quality of an image sensor.

SUMMARY

Embodiments are directed to an image sensor including a photoelectric converter to receive light, to generate charges in response to the received light, and to provide the generated charges to a first node, a transfer transistor to provide a voltage of the first node to a floating diffusion node based on a first control signal, a source follower transistor to provide a voltage of the floating diffusion node as a unit pixel output; and a correlated double sampler (CDS) to receive the unit pixel output and to convert the unit pixel output into a digital code. The first control signal has first, second, and third voltages having different voltage levels from one another. The first control signal is maintained at the second voltage in a period between when the voltage of the first node is provided to the floating diffusion node and when the CDS is provided with the voltage of the first node as the unit pixel output. When the CDS is provided with the voltage of the first node as the unit pixel output, the first control signal is switched from the second voltage to the third voltage.

Embodiments are directed to an image sensor including a photoelectric converter to receive light, to generate charges in response to the received light, and to provide the generated charges to a first node, a transfer transistor connected to the first node and a floating diffusion node and including a gate terminal receiving a first signal through a transfer line, a source follower transistor connected to a second node and a first voltage source and including a gate terminal connected to the floating diffusion node, a select transistor connected to a pixel output terminal and the second node and including a gate terminal receiving a second signal, and a correlated double sampler (CDS) to receive an input from the pixel output terminal. The first signal has first, second, and third voltages having different voltage levels from one another. The first signal changes from the first voltage to the second voltage before the CDS receives the input from the pixel output terminal. The first signal changes from the second voltage to the third voltage after the CDS receives the input from the pixel output terminal.

Embodiments are directed to an image sensor including a first pixel connected to a first transfer line, to which a first signal is provided, and including a first floating diffusion node, a second pixel connected to the first transfer line and including a second floating diffusion node, which is different from the first floating diffusion node, and a correlated double sampler (CDS) to receive a first output from the first pixel and to receive a second output from the second pixel. When the first signal has a first voltage, second and third signals are provided to the first and second floating diffusion nodes, respectively. When the first signal has a second voltage, the second and third signals are provided to the CDS as the first and second outputs, respectively. When the first signal has a third voltage, the CDS converts the first and second outputs into digital codes. The first, second, and third voltages of the first signal have different voltage levels from one another.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
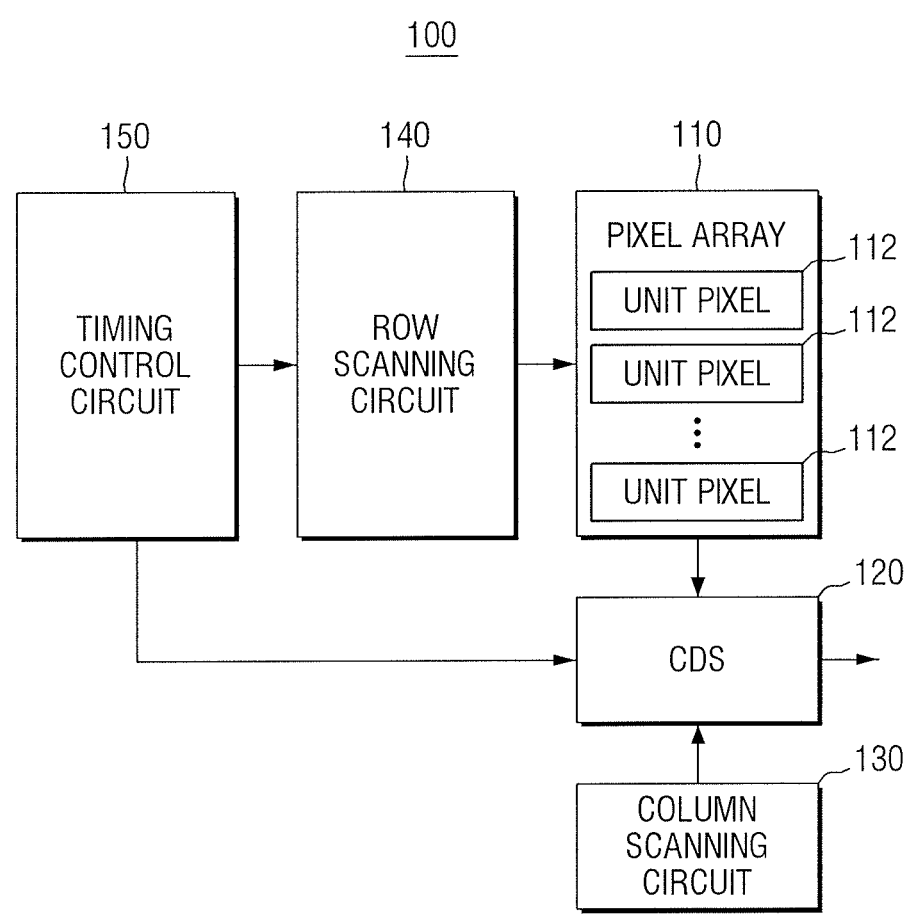
FIG. 1 illustrates a block diagram of an image sensor according to some embodiments.

FIG. 1 illustrates a block diagram of an image sensor according to some embodiments.

Referring to FIG. 1, an image sensor 100 may include a pixel array 110, a correlated double sampler (CDS) 120, a column scanning circuit 130, a row scanning circuit 140, and a timing control circuit 150.

The pixel array 110 may include a plurality of unit pixels 112. The unit pixels 112 may be arranged in a matrix form.

Structures of the unit pixels 112 may be classified into a 3-transistors structure, a 4-transistors structure, or a 5-transistors structure according to the number of transistors included in each of the unit pixels 112.

Row selection lines may be arranged along rows of the unit pixels 112 in the pixel array 110, and column selection lines may be arranged along columns of the unit pixels 112 in the pixel array 110. For example, when the pixel array 110 includes M*N unit pixels 112 (where M and N are integer values of 2 or greater), first to M-th row selection lines and first to N-th column selection lines may be provided for the M*N unit pixels 112 in the pixel array 110.

In some embodiments, when the image sensor 100 has a Bayer pattern, the unit pixels 112 in the pixel array 110 may include pixels for receiving or detecting red (R) light, pixels for receiving or detecting green (G) light, and pixels for receiving or detecting blue (B) light. In other embodiments, the unit pixels 112 in the pixel array 110 may include pixels for receiving or detecting magenta (Mg) light, pixels for receiving and detecting yellow (Y) light, pixels for receiving or detecting cyan (Cy) light, and/or pixels for receiving or detecting white (W) light. The CDS 120 may include a plurality of analog-to-digital converters (ADCs) including, e.g., comparators, counters, and latches.

The correlated double sampler (CDS) 120 may be controlled by the timing control circuit 150. The CDS 120 may operate repeatedly for each period for selecting or activating the row selection lines by the row scanning circuit 140 (i.e., for each row scan period).

The row scanning circuit 140 may receive control signals from the timing control circuit 150. The row scanning circuit 140 may control a row addressing operation or a row scanning operation on the pixel array 110 in accordance with the received control signals. The row scanning circuit 140 may apply a signal for activating or selecting a particular row selection line among the row selection lines connected to the pixel array 110. The row scanning circuit 140 may include, e.g., a row decoder that selects the particular row selection line among the row selection lines and a row driver that activates the selected row selection line.

The column scanning circuit 130 may receive control signals from the timing control circuit 150. The column scanning circuit 130 may control a column addressing operation and a column scanning operation on the pixel array 110 in accordance with the received control signals. The column scanning circuit 130 may output a digital output signal generated from the CDS 120 to a digital signal processor (DSP), an image signal processor (ISP), or an external host.

For example, the column scanning circuit 130 may sequentially select or activate the ADCs of the CDS 120 by outputting a horizontal scan control signal to the CDS 120. In some embodiments, the column scanning circuit 130 may include, e.g., a column decoder that selects one of the ADCs and a column driver that drives outputs of the ADC selected by the column decoder to be transferred to a horizontal transfer line. The horizontal transfer line may have a bit width for transferring the digital output signal output from the CDS 120.

The timing control circuit 150 may control the CDS 120, the column scanning circuit 130, and the row scanning circuit 140 and may provide control signals (e.g., a clock signal and a timing control signal) for operating the CDS 120, the column scanning circuit 130, and the row scanning circuit 140. The timing control circuit 150 may include, e.g., a logic control circuit, a phase locked loop (PLL) circuit, and a communication interface circuit.

Figure 2:
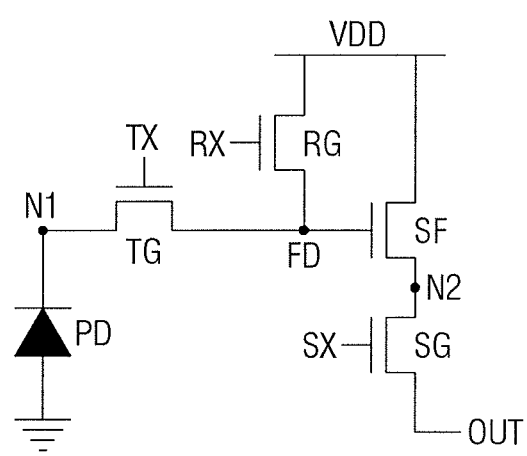
FIG. 2 illustrates a circuit diagram of a unit pixel of an image sensor according to some embodiments.
Figure 4:
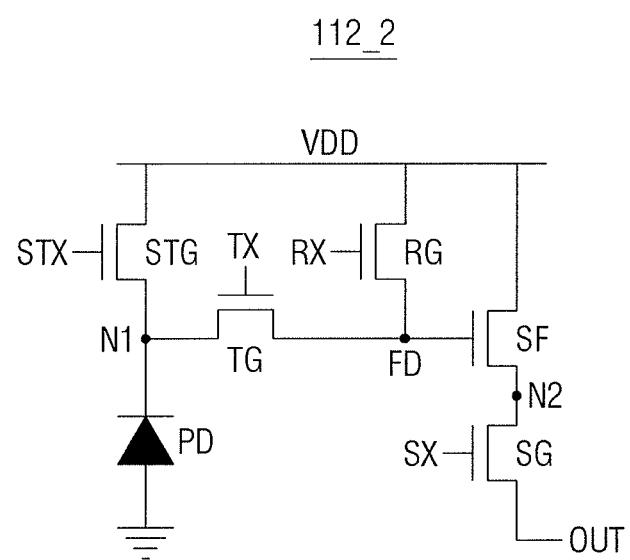
FIGS. 4 and 5 illustrate circuit diagrams of unit pixels of image sensors according to some embodiments.
Figure 5:
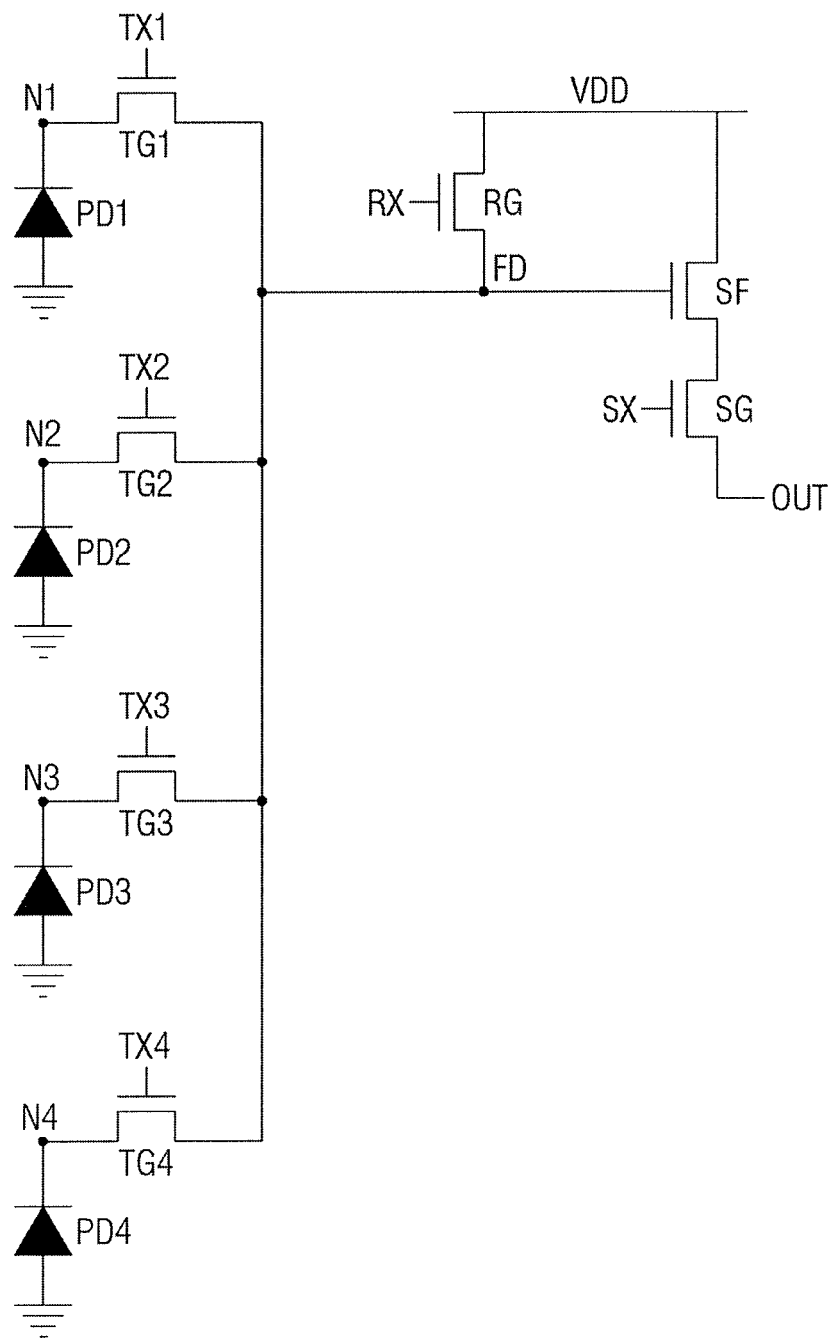

FIG. 2 illustrates a circuit diagram of a unit pixel of an image sensor according to some embodiments. FIGS. 3A through 3D illustrate circuit diagrams for explaining operations of the unit pixel. FIGS. 4 and 5 illustrate circuit diagrams of unit pixels of image sensors according to some embodiments.

Unit pixels 112_1, 112_2, and 112_3 of image sensors according to some embodiments will hereinafter be described with reference to FIGS. 2 through 5.

Referring to FIG. 2, the unit pixel 112_1 may include, e.g., a photoelectric converter PD, a transfer transistor TG, a reset transistor RG, a source follower transistor SF, and a select transistor SG.

In some embodiments, one terminal of the photoelectric converter PD may be connected to a first node N1, and another terminal of the photoelectric converter PD may be connected to, for example, a ground source.

The photoelectric converter PD may generate charges in response to external light incident thereupon. In other words, the photoelectric converter PD may receive the external light and may convert the received light into an electrical signal. The photoelectric converter PD may provide the electrical signal to the first node N1. For example, when the photoelectric converter PD receives a relatively large amount of light, the photoelectric converter PD may generate a relatively large amount of charges. When the photoelectric converter PD receives a relatively small amount of light, the photoelectric converter PD may generate a relatively small amount of charges.

Figure 3A:
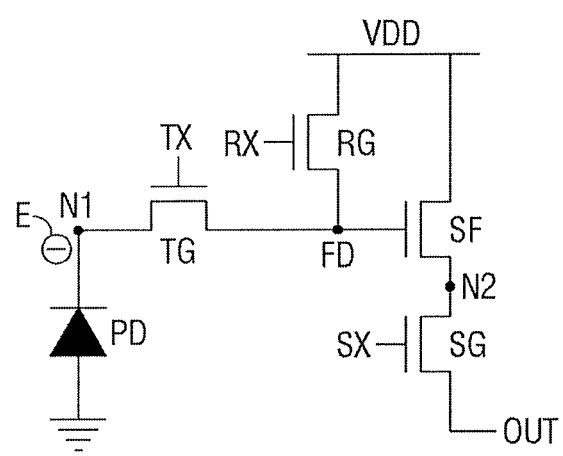
FIGS. 3A through 3D illustrate circuit diagrams for explaining operations of the unit pixel.

Referring to FIG. 3A, the photoelectric converter PD may generate electrons E in response to incident light. The electrons E may be provided to the first node N1. In other words, when the photoelectric converter PD receives the incident light, a voltage level of the first node N1 may be lowered by the electrons E generated by the photoelectric converter PD. For example, when the photoelectric converter PD receives a relatively large amount of light, the voltage level of the first node N1 may be relatively more lowered. When the photoelectric converter PD receives a relatively small amount of light, the voltage of the first node N1 may be relatively less lowered.

The photoelectric converter PD may be, e.g., a photodiode (PD). Alternatively, the photoelectric converter PD may be, e.g., a phototransistor, a photogate, a pinned photodiode (PPD), an organic PD (OPD), a quantum dot (QD), or a combination thereof.

In some embodiments, the transfer transistor TG may be connected to the first node N1 and a floating diffusion node FD. A gate terminal of the transfer transistor TG may be connected to a transfer line.

In some embodiments, a transmission signal TX may be applied to the transfer line. In other words, the transmission signal TX may be applied to the gate terminal of the transfer transistor TG through the transfer line. For example, the transmission signal TX may turn on or off the transfer transistor TG. The transmission signal TX may have first, second, and third voltages. In some embodiments, the first, second, and third voltages of the transmission signal TX may have different voltage levels from one another. For example, the first voltage may be higher than the second voltage, and the second voltage may be higher than the third voltage. For example, the first voltage may be a positive voltage, the second voltage may be a ground voltage, and the third voltage may be a negative voltage. For example, the ground voltage may be same as the ground source connected to (e.g., an anode of) the photoelectric converter PD.

For example, when the transmission signal TX has the first voltage (i.e., the positive voltage), the transfer transistor TG may be turned on. When the transmission signal TX has the second voltage or the third voltage, the transfer transistor TG may be turned off. As will be described later, the transmission signal TX may be less affected by noise when the transmission signal TX has the second voltage (i.e., the ground voltage) than when the transmission signal TX has the third voltage (i.e., the negative voltage).

When the transfer transistor TG is turned on, the first node N1 and the floating diffusion node FD may be electrically connected to each other. In other words, when the transfer transistor TG is turned on, a voltage of the first node N1 may be applied to the floating diffusion node FD. For example, when the transfer transistor TG is turned on, the voltage of the first node N1, changed by the photoelectric converter PD according to the incident light, may be transmitted to the floating diffusion node FD.

For example, when no light is received by the photoelectric converter PD, the voltage of the first node N1 may not be changed because the photoelectric converter PD may not generate any charge, and the unchanged voltage of the first node N1 may be applied to the floating diffusion node FD through the transfer transistor TG being turned on. When a relatively small amount of light is received by the photoelectric converter PD, the voltage of the floating diffusion node FD may be relatively less decreased in response to the transfer transistor TG being turned on. On the other hand, When a relatively large amount of light is received by the photoelectric converter PD, the voltage of the floating diffusion node FD may be relatively more decreased in response to the transfer transistor TG being turned on.

Figure 3B:
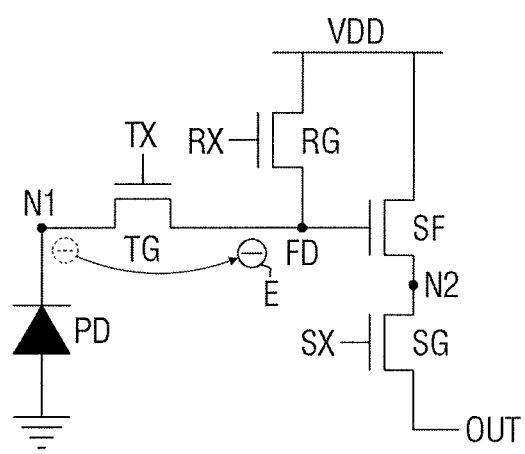

Referring to FIG. 3B, when the transfer transistor TG is turned on, the electrons E charged in the first node N1 may be provided to the floating diffusion node FD. Since the electrons E are provided to the floating diffusion node FD, the voltage of the floating diffusion node FD may be decreased.

The transfer transistor TG may be implemented as, e.g., an N-type metal oxide semiconductor (NMOS) transistor, a P-type metal oxide semiconductor (PMOS) transistor, or a complementary metal oxide semiconductor (CMOS) transistor.

In some embodiments, the reset transistor RG may be connected to the floating diffusion node FD and a first voltage source VDD. A gate terminal of the reset transistor RG may be controlled by a reset signal RX. In other words, the reset transistor RG may be turned on or off in accordance with the reset signal RX.

In some embodiments, the reset signal RX may have a high level and a low level. For example, when the reset signal RX has a high level, the reset transistor RG may be turned on. When the reset signal RX has a low level, the reset transistor RG may be turned off.

In some embodiments, the voltage of the first voltage source VDD may be referred to as a reference voltage. In some embodiments, both the first voltage source VDD and the reference voltage may be referred to by "VDD". When the reset transistor RG is turned on, the first voltage source VDD and the floating diffusion node FD may be electrically connected to each other. When the reset transistor RG is turned off, the first voltage source VDD and the floating diffusion node FD may be electrically disconnected from each other. In other words, when the reset transistor RG is turned on, the first voltage source VDD may be applied to the floating diffusion node FD such that the floating diffusion node FD may be reset to the first voltage source VDD as the reference voltage. In some embodiments, the voltage level of the first node N1 may be lowered according to the amount of light received by the photoelectric converter PD, and when the transfer transistor TG is turned on, the voltage of the floating diffusion node FD may be decreased. Then, when the reset transistor RG is turned on, the voltage of the floating diffusion node FD may be raised back to the reference voltage and may be initialized.

The reset transistor RG may be implemented as an NMOS transistor, a PMOS transistor, or a CMOS transistor.

In some embodiments, the source follower transistor SF may be connected to a second node N2 and the first voltage source VDD. A gate terminal of the source follower transistor SF may be controlled by the floating diffusion node FD. In other words, the gate terminal of the source follower transistor SF may receive the voltage of the floating diffusion node FD.

In some embodiments, the source follower transistor SF may provide a predetermined voltage to the second node N2 in accordance with the voltage of the floating diffusion node FD.

In some embodiments, the source follower transistor SF may operate in a saturation region by the voltage of the floating diffusion node FD. In other words, the source follower transistor SF may be turned on and may flow a constant drain-source current by the voltage of the floating diffusion node FD. For example, the source follower transistor SF may shift the voltage of the floating diffusion node FD by a threshold voltage of the source follower transistor SF and may transmits the shifted voltage of the floating diffusion node FD to the second node N2.

In some embodiments, the source follower transistor SF may operate as a common drain amplifier. In other words, the source follower transistor SF may operate as a voltage buffer. In some embodiments, the voltage of the floating diffusion node FD may be directly connected to the second node N2 such that the voltage of the floating diffusion node FD may be directly transmitted to the second node N2.

In some embodiments, the reset transistor RG and the source follower transistor SF may be connected to the first voltage source VDD. In other embodiments, the reset transistor RG and the source follower transistor SF may be connected to different voltage sources, respectively.

Figure 3C:
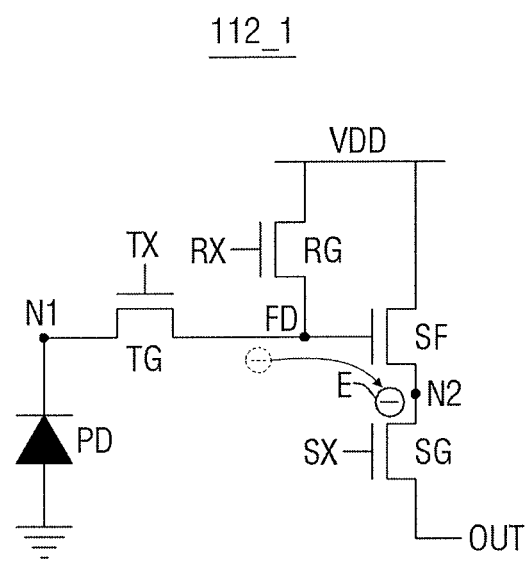

Referring to FIG. 3C, the electrons E provided from the first node N1 to the floating diffusion node FD may be provided to the second node N2 via the source follower transistor SF, and the voltage of the second node N2 may be decreased by the electron E.

In some embodiments, the select transistor SG may be connected to an output terminal OUT of the unit pixel 112_1 and the second node N2. A gate terminal of the select transistor SG may be controlled by a selection signal SX. In other words, the gate terminal of the select transistor SG may receive the selection signal SX.

In some embodiments, the selection signal SX may have a high level and a low level. For example, when the selection signal SX has a high level, the select transistor SG may be turned on. When the selection signal SX has a low level, the select transistor SG may be turned off.

When the select transistor SG is turned on, the second node N2 and the output terminal OUT of the unit pixel 112_1 may be electrically connected to each other. In other words, when the select transistor SG is turned on, the voltage of the second node N2 may be applied to the output terminal OUT of the unit pixel 112_1.

Figure 3D:
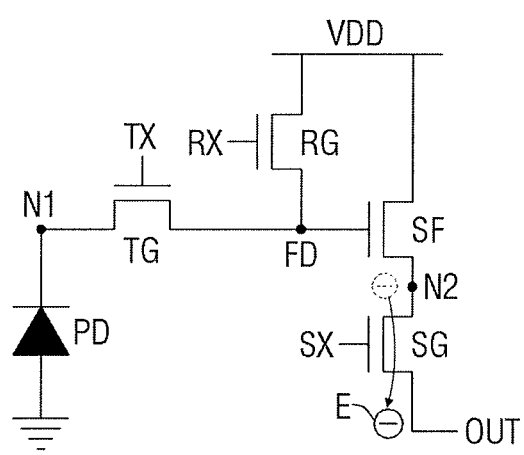

Referring to FIG. 3D, when the select transistor SG is turned on, the electrons E provided from the floating diffusion node FD to the second node N2 may be provided to the output terminal OUT of the unit pixel 112_1, and the voltage of the output terminal OUT of the unit pixel 112_1 may be decreased by the electrons E.

FIG. 4 illustrates a unit pixel 112_2 of a display device according to some embodiments. For convenience, descriptions of the same elements or features as those in the embodiment of FIG. 2 will be omitted or at least simplified.

Referring to FIG. 4, the unit pixel 112_2 may include a photoelectric converter PD, a transfer transistor TG, a reset transistor RG, a source follower transistor SF, a select transistor SG, and a shutter transistor STG.

The shutter transistor STG may be connected to a first node N1 and a first voltage source VDD. A gate terminal of the shutter transistor STG may be controlled by a shutter signal STX. In other words, the gate terminal of the shutter transistor STG may receive the shutter signal STX.

In some embodiments, the shutter signal STX may have a high level and a low level. For example, when the shutter signal STX has a high level, the shutter transistor STG may be turned on. When the shutter signal STX has a low level, the shutter transistor STG may be turned off.

When the shutter transistor STG is turned on, the first node N1 and the first voltage source VDD may be electrically connected to each other. When the shutter transistor STG is turned off, the first node N1 and the first voltage source VDD may be electrically disconnected from each other. In other words, when the shutter transistor STG is turned on, the first voltage source VDD may be applied to the first node N1. For example, when the shutter transistor STG is turned on, the first node N1 may be reset to the first voltage source VDD as a reference voltage and may be initialized.

In some embodiments, the shutter transistor STG, the reset transistor RG, and the source follower transistor SF may be connected to the first voltage source VDD. In other embodiments, the shutter transistor STG, the reset transistor RG, and the source follower transistor SF may be connected to different voltage sources.

FIG. 5 illustrates a unit pixel 112_3 of a display device according to some embodiments. For convenience, descriptions of the same elements or features as those in the embodiments of FIGS. 2 through 4 will be omitted or at least simplified.

Referring to FIG. 5, the unit pixel 112_3 may include first through fourth photoelectric converters PD1 through PD4, first through fourth transfer transistors TG1 through TG4, a reset transistor RG, a source follower transistor SF, and a select transistor SG.

In some embodiments, first terminals of the first through fourth photoelectric converters PD1 through PD4 may be connected to the first through fourth nodes N1 through N4, and second terminals of the first through fourth photoelectric converters PD1 through PD4 may be connected to, for example, a ground source.

The first through fourth photoelectric converters PD1 through PD4 may be the same as, or similar to, the photoelectric converters PD in FIGS. 2 and 4. For example, the first through fourth photoelectric converters PD1 through PD4 may generate electrons in response to incident light. The generated electrons may be provided to the first through fourth nodes N1 through N4. In other words, when the first through fourth photoelectric converters PD1 through PD4 receive the incident light, voltage levels of the first through fourth nodes N1 through N4 may be lowered by the electrons generated by the first through fourth photoelectric converters PD1 through PD4.

In some embodiments, the first through fourth photoelectric converters PD1 through PD4 may receive visible light of different wavelengths. For example, color filters may be disposed on the first through fourth photoelectric converters PD1 through PD4 so that the first through fourth photoelectric converters PD1 through PD4 may receive visible light of different wavelengths thorough the color filters on the first through fourth photoelectric converters PD1 through PD4.

For example, the first photoelectric converter PD1 may receive red (R) light, the second and third photoelectric converters PD2 and PD3 may receive green (G) light, and the fourth photoelectric converter PD4 may receive blue (B) light.

For example, the first photoelectric converter PD1 may receive magenta (Mg) light, the second photoelectric converter PD2 may receive yellow (Y) light, the third photoelectric converter PD3 may receive cyan (Cy) light, and the fourth photoelectric converter PD4 may receive white (W) light.

In some embodiments, the first through fourth transfer transistors TG1 through TG4 may be connected to the first through fourth nodes N1 through N4 and a floating diffusion node FD. Gate terminals of the first through fourth transfer transistors TG1 through TG4 may be connected to different transfer lines. In other words, the gate terminals of the first through fourth transfer transistors TG1 through TG4 may receive first through fourth transmission signals TX1 through TX4, respectively.

For example, the unit pixel 112_3 may have a structure in which the floating diffusion node FD is shared with the first through fourth transfer transistors TG1 through TG4. In other words, the first through fourth transfer transistors TG1 through TG4 may be commonly connected to the floating diffusion node FD.

FIG. 5 illustrates the unit pixel 112_3 including, e.g., four photoelectric converters and four transfer transistors. Alternatively, the unit pixel 112_3 may include, e.g., eight photoelectric converters and eighth transfer transistors.

The unit pixels 112_1, 112_2, and 112_3 in FIGS. 2 through 5 are exemplary examples. In other exemplary embodiments, unit pixels may be realized in various manners, other than those set forth herein.

Figure 6:
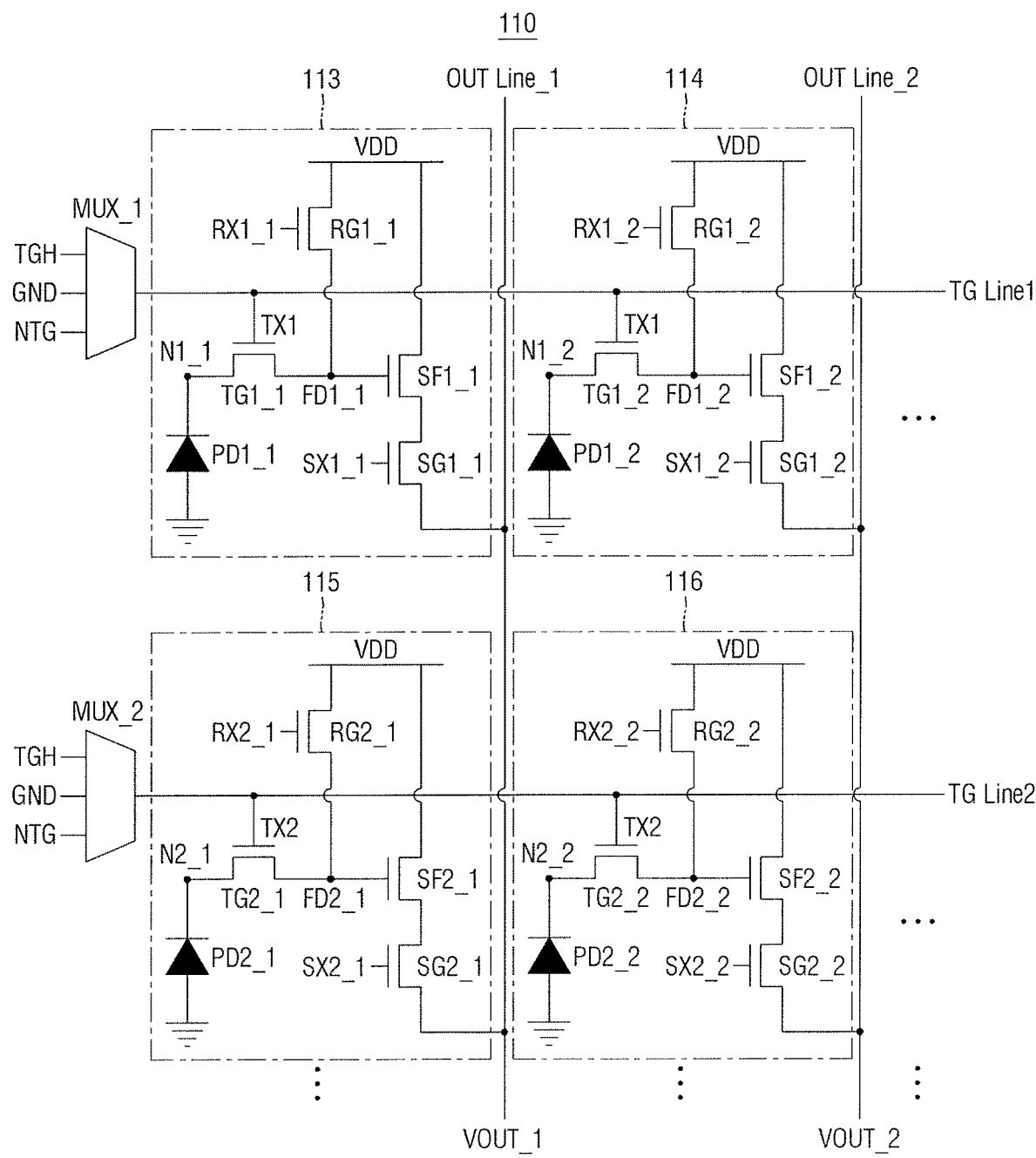
FIG. 6 illustrates a circuit diagram of a pixel array according to some embodiments.

FIG. 6 is a circuit diagram of a pixel array according to some embodiments.

Referring to FIG. 6, a pixel array 110 may include first through fourth unit pixels 113 through 116, first and second multiplexers MUX_1 and MUX_2, first and second output lines OUT Line_11 and OUT Line_2, and first and second transfer lines TG Line_1 and TG Line_2. The numbers of unit pixels, multiplexers, output lines, and transfer lines may vary according to exemplary embodiments.

In some embodiments, the first through fourth unit pixels 113 through 116 may be the same as, or similar to, the unit pixels 112_1 in FIG. 2, 112_2 in FIG. 4, and 112_3 in FIG. 5. For convenience, it is assumed that the first through fourth unit pixels 113 through 116 are the same as the unit pixel 112_1 of FIG. 2. For convenience, descriptions of the same elements or features as those in the embodiments of FIGS. 2 through 5 will be omitted or at least simplified.

In some embodiments, the first through fourth unit pixels 113 through 116 may receive visible light of different wavelengths. For example, the first unit pixel 113 may receive red (R) light, the second and third unit pixels 114 and 115 may receive green (G) light, and the fourth unit pixel 116 may receive blue (B) light. In other embodiments, the first unit pixel 113 may receive magenta (Mg) light, the second unit pixel 114 may receive yellow (Y) light, the third unit pixel 115 may receive cyan (Cy) light, and the fourth unit pixel 116 may receive white (W) light.

In some embodiments, the first multiplexer MUX_1 may receive a first voltage TGH (e.g., a positive voltage), a second voltage GND (e.g., a ground voltage or 0 V), and a third voltage NTG (e.g., a negative voltage). The first multiplexer MUX_1 may provide one of the first, second, and third voltages TGH, GND, and NTG to the first transfer line TG Line_1. In other words, the first multiplexer MUX_1 may provide one of the first, second, and third voltages TGH, GND, and NTG to the first transfer line TG Line_1 as a first transmission signal TX1.

In some embodiments, the second multiplexer MUX_2 may receive the first, second, and third voltages TGH, GND, and NTG. The second multiplexer MUX_2 may provide one of the first, second, and third voltages TGH, GND, and NTG to the second transfer line TG Line_2. In other words, the second multiplexer MUX_2 may provide one of the first, second, and third voltages TGH, GND, and NTG to the second transfer line TG Line_2 as a second transmission signal TX2.

In some embodiments, gate terminals of first and second transfer transistors TG1_1 and TG1_2 of the first and second unit pixels 113 and 114 may be connected to the first transfer line TG Line_1, and gate terminals of third and fourth transfer transistors TG2_1 and TG2_2 of the third and fourth unit pixels 115 and 116 may be connected to the second transfer line TG Line_2. For example, gate terminals of unit pixels in the same row may be connected to the same transfer line.

In some embodiments, first and third select transistors SG1_1 and SG2_1 of the first and third unit pixels 113 and 115 may be connected to the first output line OUT Line_1, and second and fourth select transistors SG1_2 and SG2_2 of the second and fourth unit pixels 114 and 116 may be connected to the second output line OUT Line_2. For example, unit pixels in the same column may be connected to the same output line. In some embodiments, voltages of the first and second output lines OUT Line_1 and OUT Line_2 may be defined as first and second output voltages VOUT_1 and VOUT_2, respectively.

Figure 7:
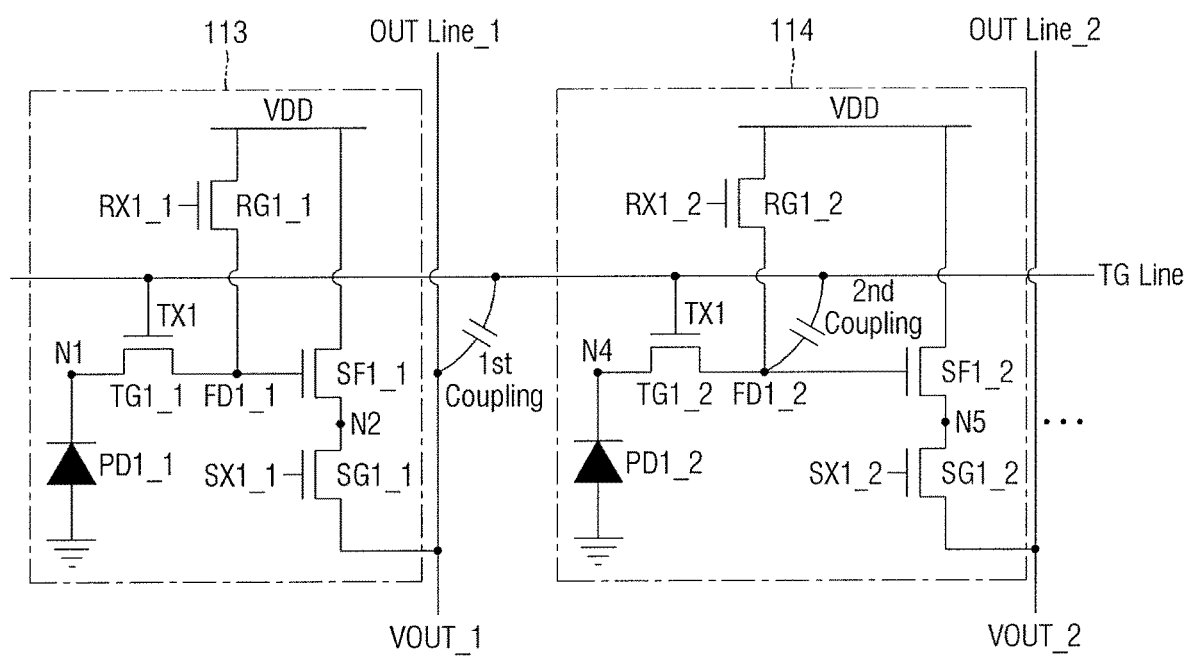
FIGS. 7 and 8 illustrate a circuit diagram and a timing diagram, respectively, for explaining how noise may be generated in a particular row of the pixel array.
Figure 8:
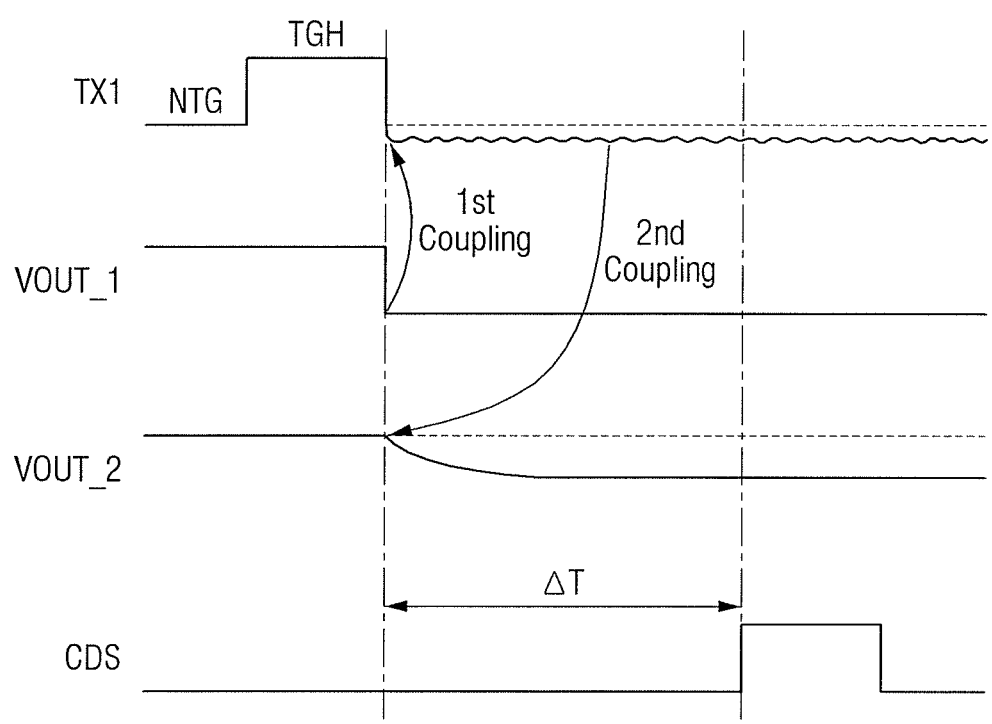

FIGS. 7 and 8 illustrate noise problems caused by sharing a first transfer line TG Line with first and second unit pixels 113 and 114. For example, FIGS. 7 and 8 illustrate noise caused by a first capacitive coupling between the first transfer line TG Line and a first output line OUT Line_1 and by a second capacitive coupling between the first transfer line TG Line and a second output line OUT Line_2.

FIGS. 7 and 8 illustrate a circuit diagram and a timing diagram, respectively, for explaining how noise may be generated in a particular row of the pixel array.

For convenience, it is assumed that a relatively large amount of light is received in a first region corresponding to the first unit pixel 113 and no light is received or transmitted in a second region corresponding to the second unit pixel 114. It is also assumed that a reference voltage is the same as a first voltage source VDD.

When light is received or transmitted in the first region corresponding to the first unit pixel 113, a first photoelectric converter PD1_1 may generate charges and may provide the generated charges to a first node N1. For example, a voltage of the first node N1 may be lowered than the reference voltage by the charges provided from the first photoelectric converter PD1_1.

When a first transmission signal TX1 has a first voltage TGH (e.g., a positive voltage), the first node N1 and a first floating diffusion node FD1_1 may be electrically connected to each other through a first transfer transistor TG1_1 being turned on. In other words, the voltage of the first node N1 being lowered than the reference voltage may be applied to the first floating diffusion node FD1_1. Thus, a voltage of the first floating diffusion node FD1_1 may be lowered than the reference voltage as the first voltage source VDD.

The voltage of the first floating diffusion node FD1_1 may be provided to a second node N2 through a first source follower transistor SF1_1. A first selection signal SX1_1 may be provided to a first select transistor SG1_1. When the first selection signal SX1_1 has a high level, the second node N2 and the first output line OUT Line_1 may be electrically connected to each other. In other words, when the first selection signal SX1_1 has a high level, the voltage of the first floating diffusion node FD1_1 may be transmitted to the first output line OUT Line_1 via the first source follower transistor SF1_1 and the first select transistor SG1_1.

Thus, when light is received or transmitted in the first region corresponding to the first unit pixel 113, a first output voltage VOUT_1 of the first output line OUT Line_1 may be relatively lowered. The first output voltage VOUT_1 may be transmitted to the CDS 120 in FIG. 1 and may then be converted into a digital code.

For example, when no light is transmitted in the second region corresponding to the second unit pixel 114, a second photoelectric converter PD1_2 may not generate charges. In other words, the voltage of a fourth node N4 may be substantially the same as the reference voltage as a reset voltage of the fourth node N4, i.e., the voltage of the fourth node N4 and the reference voltage are the same, assuming that there is no voltage drop from passing through conductive lines and elements.

When the first transmission signal TX1 has the first voltage TGH, the fourth node N4 and a second floating diffusion node FD1_2 may be electrically connected to each other. Thus, a voltage of the second floating diffusion node FD1_2 may be substantially the same as the reference voltage.

The voltage of the first floating diffusion node FD1_2 may be provided to a fifth node N5 by a second source follower transistor SF1_2, and a second selection signal SX1_2 may be provided to a second select transistor SG1_2. When the second selection signal SX1_2 has a high level, the fifth node N5 and the second output line OUT Line_2 may be electrically connected to each other. In other words, when the second selection signal SX1_2 has a high level, the voltage of the second floating diffusion node FD1_2 may be transmitted to the second output line OUT Line_2 via the second source follower transistor SF1_2 and the second select transistor SG1_2.

Thus, a second output voltage VOUT_2 of the second output line OUT Line_1 may be relatively higher than the first output voltage VOUT_1. The second output voltage VOUT_2 may be transmitted to the CDS 120 in FIG. 1 and may then be converted into a digital code/signal.

For example, when light is received or transmitted in the first region corresponding to the first unit pixel 113 and no light is transmitted in the second region corresponding to the second unit pixel 114, the first output voltage VOUT_1 may be relatively lower than the reference voltage, and the second output voltage VOUT_2 may be substantially the same as the reference voltage.

However, when only the first output voltage VOUT_1 of the first output line OUT Line_1 decreases (or has a falling edge), coupling noises may be generated through a first parasitic capacitor, between the first output line OUT Line_1 and the first transfer line TG Line, and through a second parasitic capacitor, between the first transfer line TG Line and the second output line OUT Line_2. This will hereinafter be described with reference to FIG. 8.

Referring to FIG. 8, when a voltage of the first transmission signal TX1 increases to the first voltage TGH and then decreases to a third voltage LTG, the first output voltage VOUT_1 may be sharply decreased and may then be maintained at a constant level. In other words, when the first transfer transistor TG1_1 is turned on, the first output voltage VOUT_1 may decrease and may then be maintained.

Due to the decrease (or the voltage drop/transition) of the first output voltage VOUT_1, a first parasitic capacitive coupling ("$1^{st}$ Coupling") is formed between the first output line OUT Line_1 and the first transfer line TG Line through the first parasitic capacitor between the first output line OUT Line_1 and the first transfer line TG Line. In other words, the first output line OUT Line_1 and the first transfer line TG Line may be capacitively coupled to each other through the first parasitic capacitor between the first output line OUT Line_1 and the first transfer line TG Line, which is adjacent to the first output line OUT Line_1, so that the voltage of the first transmission signal TX1 may decrease by the voltage drop/transition of the first output voltage VOUT_1.

Due to the decrease of the voltage of the first transmission signal TX1, a second parasitic capacitive coupling ("$2^{nd}$ Coupling") is formed between the first transfer line TG Line and the second output line OUT Line_2. In other words, the first transfer line TG Line and the second output line OUT Line_2 may be capacitively coupled to each other through the second parasitic capacitor between the first transfer line TG Line and the second output line OUT Line_2 so that the second output voltage VOUT_2 may decrease by the decrease of the voltage of the first transmission signal TX1.

The first and second output voltages VOUT_1 and VOUT_2 (which may be affected or changed by the first and second parasitic capacitive couplings) may be provided to the CDS 120 of FIG. 1. The CDS 120 may convert the first and second output voltages VOUT_1 and VOUT_2 into digital codes. In other words, the CDS 120 may convert an amount of light received by each unit pixel into a digital code and may output the digital code. A digital code regarding the second unit pixel 114 may indicate that the second unit pixel 114 receives a larger amount of light than an actual amount of light received by the second unit pixel 114, because the second output voltage VOUT_2 may decrease by the voltage drop of the first transmission signal TX1 through the first and second parasitic capacitive couplings. In other words, when the second unit pixel 114 receives no light, the CDS 120 may output a digital code/signal indicating that the second unit pixel 114 receives some amount of light.

In some embodiments, not only the first and second unit pixels 113 and 114, but also other multiple unit pixels in the same row, may share the first transfer line TG Line. For example, other parasitic capacitive couplings may be formed between the output lines of the other multiple unit pixels and the first transfer line TG Line. Thus, digital codes indicating that the other multiple unit pixels receive larger amounts of light than actual amounts of light received by the other multiple unit pixels through the parasitic capacitive couplings between the first transfer line TG Line and output lines of the other multiple unit pixels.

In other words, digital codes may indicate that unit pixels sharing the first transfer line TG Line (i.e., unit pixels in the same row as the first unit pixel 113) may receive brighter light than actual light that they receive. For example, an image (e.g., a digital image) that is detected by the unit pixels in the same row as the first unit pixel 113 may be brighter than an actual image (e.g., an optical image) transmitted to the unit pixels, because the voltage drop/transition of the first output voltage VOUT_1 of the first unit pixel 113 may affect voltages of the output lines of the other multiple unit pixels through the parasitic capacitive couplings between the first output line OUT Line_1, the first transfer line TG Line, and the output lines of the other multiple unit pixels. Thus, due to the parasitic capacitive couplings between the first output line OUT Line_1 and the first transfer line TG Line and between the first transfer line TG Line and the second output line OUT Line_2, noise may be generated in the entire row where the first unit pixel 113 is arranged and may distort or degrade an image corresponding to the entire row.

For example, noise may be generated in a particular row of the pixel array 110 by the parasitic capacitive couplings in a period ΔT between when the first transmission signal TX1 is switched (or changed) from the first voltage TGH to the third voltage NTG and when an output voltage is provided to the CDS 120 of FIG. 1.

Figure 9:
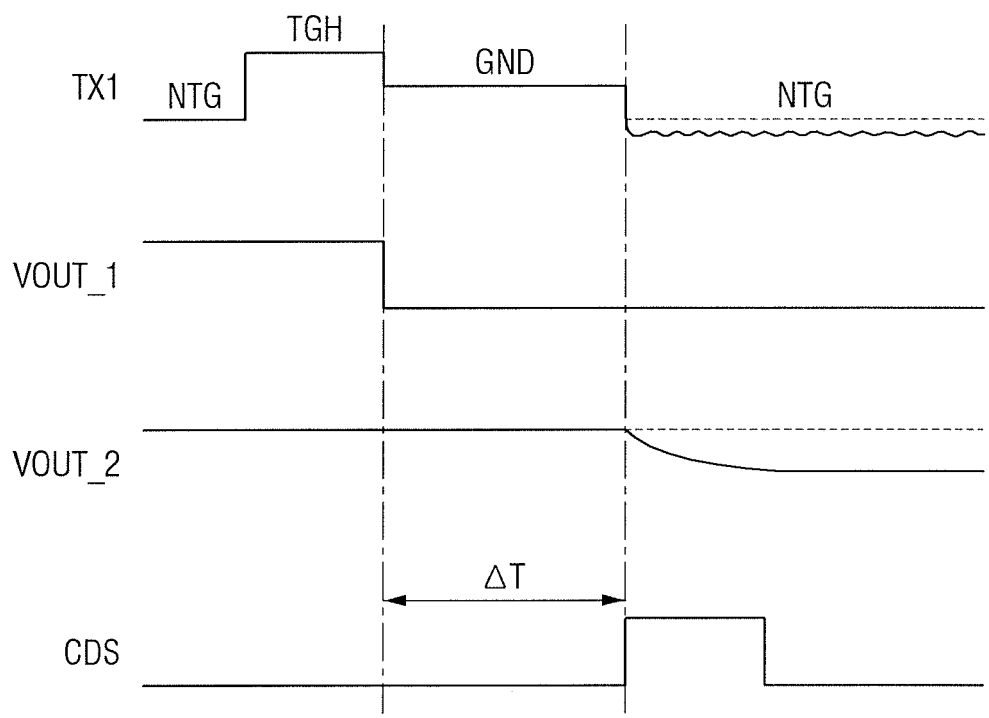
FIG. 9 illustrates a timing diagram for explaining a method of controlling a transmission signal according to some embodiments.

FIG. 9 illustrates a timing diagram for explaining a method of controlling a transmission signal according to some embodiments.

Referring to FIG. 9, a transmission signal TX may be switched or changed from a first voltage TGH to a second voltage GND. In some embodiments, the transmission signal TX may correspond to both the first and second transmission signals TX1 and TX2. In some embodiments, the second voltage GND may be 0 V or a ground source connected to a photoelectric converter PD. The second voltage GND may be more stable than the first and third voltages TGH and NTG. In other words, the second voltage GND may be less affected by a coupling noise and may be robust to any noise. Thus, when the voltage level of the transmission signal TX is maintained at the second voltage GND, the voltage level of the transmission signal TX may be uniformly or stably maintained without any fluctuation regardless of, e.g., parasitic capacitive couplings between the first output line OUT Line_1, the first transfer line TG Line, and the second output line OUT_2 in FIG. 7.

Thus, the voltage of the transmission signal TX may be maintained at the second voltage GND in a period ΔT between when the transmission signal TX is switched or changed from the first voltage TGH to the second voltage GND and when the CDS 120 of FIG. 1 is provided with an output voltage.

After an output voltage is provided to the CDS 120, the transmission signal TX may be switched or changed from the second voltage GND to a third voltage NTG. After the transmission signal TX is switched or changed to the third voltage NTG, the second output voltage VOUT_2 may decrease or may be dropped due to the parasitic capacitive couplings between the first output line OUT Line_1, the first transfer line TG Line, and the second output line OUT_2. However, the output of the CDS 120 may not be affected by the voltage drop of the first output voltage VOUT_1 because the first output voltage VOUT_1 and the second output voltage VOUT_2 are already provided to the CDS 120.

In other words, the voltage of the transmission signal TX may be maintained at the first voltage TGH while charges generated by a photoelectric converter PD are being provided to a floating diffusion node FD. After charges generated by the photoelectric converter PD is provided to the floating diffusion node FD, the voltage of the transmission signal TX may be changed from the first voltage TGH to the second voltage GND and may be maintained at the second voltage GND while the voltage of the floating diffusion node FD is being provided to the CDS 120. After the voltage of the floating diffusion node FD is provided to the CDS 120, the level of the transmission signal TX may be changed from the second voltage GND to the third voltage NTG.

Thus, in some embodiments, noise that may occur in a particular row of the pixel array 110 may be prevented by maintaining the voltage of the transmission signal TX at the second voltage GND in the period ΔT between when the transmission signal TX is switched or changed from the first voltage TGH to another voltage (i.e., when the transfer transistor TG is turned off) and when the CDS 120 receives output voltages from unit pixels in the particular row of the pixel array 110. In other exemplary embodiments, the period ΔT may be between when at least one of the unit pixels in the particular row of the pixel array 110 outputs a low level output signal corresponding to a bright light to a corresponding output line coupled to the CDS 120 and when the CDS 120 receives the output voltages (including the low level output signal) from the unit pixels in the particular row of the pixel array 110 through corresponding output lines coupled to the CDS 120.

Although some embodiments have been disclosed for illustrative purposes, those skilled in the art will appreciate that various modifications, additions and substitutions are possible.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:
   a photoelectric converter to receive light, to generate charges in response to the received light, and to provide the generated charges to a first node;
   a transfer transistor to provide a voltage of the first node to a floating diffusion node based on a first control signal;
   a shutter transistor directly connected to the first node, the shutter transistor to reset the voltage of the first node;
   a source follower transistor to provide a voltage of the floating diffusion node as a unit pixel output;
   a correlated double sampler (CDS) to receive the unit pixel output and to convert the unit pixel output into a digital code; and
   a multiplexer to output the first control signal, wherein:
   the first control signal has first, second, and third voltages having different voltage levels from one another,
   the first control signal is maintained at the second voltage in a period between when the voltage of the first node is provided to the floating diffusion node and when the CDS is provided with the voltage of the first node as the unit pixel output,
   when the CDS is provided with the voltage of the first node as the unit pixel output, the first control signal is switched from the second voltage to the third voltage,
   the first voltage is a positive voltage, the second voltage is a ground voltage, and the third voltage is a negative voltage, and
   the multiplexer is configured to switch the voltage of the first control signal in sequence from the negative voltage directly to the positive voltage directly to the ground voltage.

2. The image sensor as claimed in claim 1, wherein when the first control signal has the first voltage, the first node and the floating diffusion node are electrically connected to each other such that the voltage of the first node is provided to the floating diffusion node.

3. The image sensor as claimed in claim 1, wherein when the first control signal has the second and third voltages, the first node and the floating diffusion node are electrically disconnected from each other.

4. The image sensor as claimed in claim 3, wherein a noise level of the first control signal is lower when the first control signal has the second voltage than when the first control signal has the third voltage.

5. The image sensor as claimed in claim 1, wherein a gate terminal of the transfer transistor is connected to a transfer line, and the first control signal is provided to the gate terminal of the transfer transistor through the transfer line.

6. The image sensor as claimed in claim 1, further comprising a reset transistor to reset the voltage of the floating diffusion node.

7. The image sensor as claimed in claim 1, further comprising a select transistor to selectively provide the unit pixel output to the CDS.

8. An image sensor, comprising:
   a photoelectric converter to receive light, to generate charges in response to the received light, and to provide the generated charges to a first node;
   a transfer transistor connected to the first node and a floating diffusion node and including a gate terminal receiving a first signal through a transfer line;
   a shutter transistor directly connected to the first node, the shutter transistor to reset the first node;
   a source follower transistor connected to a second node and a first voltage source and including a gate terminal connected to the floating diffusion node;
   a select transistor connected to a pixel output terminal, and the second node and including a gate terminal receiving a second signal;
   a correlated double sampler (CDS) to receive an input from the pixel output terminal, and
   a multiplexer to output the first signal to the transfer line, wherein:
   the first signal has first, second, and third voltages having different voltage levels from one another,
   the first signal changes from the first voltage to the second voltage before the CDS receives the input from the pixel output terminal,
   the first signal changes from the second voltage to the third voltage after the CDS receives the input from the pixel output terminal,
   the first voltage is a positive voltage, the second voltage is a ground voltage, and the third voltage is a negative voltage, and
   the multiplexer is configured to switch the voltage of the first signal in sequence from the negative voltage directly to the positive voltage directly to the ground voltage.

9. The image sensor as claimed in claim 8, wherein a noise level of the first signal is lower when the first signal has the second voltage than when the first signal has the third voltage.

10. The image sensor as claimed in claim 8, further comprising a reset transistor connected to the floating diffusion node and the first voltage source.

11. An image sensor, comprising:
    a first pixel connected to a first transfer line, to which a first signal is provided, and including a first floating diffusion node and a first node directly connected to a first photoelectric converter;

a second pixel connected to the first transfer line and including a second floating diffusion node, which is different from the first floating diffusion node and a second node which is different from the first node and directly connected to a second photoelectric converter;

a first shutter transistor directly connected to the first node, the first shutter transistor to reset the first node;

a second shutter transistor directly connected to the second node, the second shutter transistor to reset the second node;

a correlated double sampler (CDS) to receive a first output from the first pixel and to receive a second output from the second pixel; and a multiplexer to output the first signal to the first transfer line, wherein:

when the first signal has a first voltage, second and third signals are provided to the first and second floating diffusion nodes, respectively, when the first signal has a second voltage, the second and third signals are provided to the CDS as the first and second outputs, respectively, when the first signal has a third voltage, the CDS converts the first and second outputs into digital codes, the first, second, and third voltages of the first signal have different voltage levels from one another, the first voltage is a positive voltage, the second voltage is a ground voltage, and the third voltage is a negative voltage, and the multiplexer is configured to switch the voltage of the first signal in sequence from the negative voltage directly to the positive voltage directly to the ground voltage.

12. The image sensor as claimed in claim 11, wherein a noise level of the first signal is lower when the first signal has the second voltage than when the first signal has the third voltage.

* * * * *